(12) United States Patent
Kwak

(10) Patent No.: US 9,947,147 B1
(45) Date of Patent: Apr. 17, 2018

(54) VEHICLE ELECTRONIC LOGGING AUTHORIZATION AND HANDOVER SYSTEM

(71) Applicant: TrueLite Trace, Inc., Milpitas, CA (US)

(72) Inventor: Sung Bok Kwak, Milpitas, CA (US)

(73) Assignee: Truelite Trace, Inc., Milpitas, CA (US)

( * ) Notice: Subject to any disclaimer, the term of this patent is extended or adjusted under 35 U.S.C. 154(b) by 0 days.

(21) Appl. No.: 15/449,950

(22) Filed: Mar. 4, 2017

(51) Int. Cl.
| | |
|---|---|
| *G07C 5/02* | (2006.01) |
| *G07C 5/08* | (2006.01) |
| *G07C 1/10* | (2006.01) |
| *G07C 3/02* | (2006.01) |
| *B60R 25/24* | (2013.01) |
| *G07C 5/00* | (2006.01) |
| *H04L 29/08* | (2006.01) |

(52) U.S. Cl.
CPC .......... *G07C 5/02* (2013.01); *B60R 25/24* (2013.01); *G07C 1/10* (2013.01); *G07C 3/02* (2013.01); *G07C 5/008* (2013.01); *G07C 5/085* (2013.01); *G07C 5/0808* (2013.01); *B60R 2325/205* (2013.01); *H04L 67/12* (2013.01)

(58) Field of Classification Search
CPC ........ G07C 5/02; G07C 5/008; G07C 5/0808; G07C 5/085; G07C 1/10; G07C 3/02; B60R 25/24; B60R 2325/205; H04L 67/12
See application file for complete search history.

(56) References Cited

U.S. PATENT DOCUMENTS

| 8,013,402 B2 * | 9/2011 | Lim ................. H01L 21/28079 257/411 |
| 2017/0076601 A1 * | 3/2017 | Harter ..................... G08G 1/123 |
| 2017/0206487 A1 * | 7/2017 | Gloudemans .. G06Q 10/063114 |

* cited by examiner

*Primary Examiner* — Russell Frejd
(74) *Attorney, Agent, or Firm* — Invent Capture, LLC.; Samuel S. Cho

(57) ABSTRACT

A novel vehicle electronic logging authorization and handover system is configured to provide commercial vehicle driver log handover requests and authorizations to improve and preserve robustness and non-overlapping uniqueness of electronically-generated commercial vehicle driver log data among a plurality of drivers who time-share a vehicle. In one embodiment, the novel vehicle electronic logging authorization and handover system includes a vehicle OBD device, a vehicle ELD, a remote ELD log handover authorization application executed on a first driver's portable electronic device, a remote ELD log handover request application executed on a second driver's portable electronic device, and a commercial fleet operation vehicle electronic logging database and management system. The drivers are able to remotely request or authorize ELD log handovers to other drivers, even if they are not inside or near the time-shared vehicle at the time of ELD log handover request or authorization.

10 Claims, 8 Drawing Sheets

An Embodiment of a Hardware Component Block Diagram for a Vehicle Electronic Logging Authorization and Handover System

100

An Embodiment of a Hardware Component Block Diagram for a Vehicle Electronic Logging Authorization and Handover System

100

A Timing Diagram Example for an ELD-Equipped Shared Vehicle Operation Between Two Drivers

200

An Example of Vehicle Log Handover Requests and Responses for an ELD-Equipped Shared Vehicle Between Two Drivers

300

A User Interface Screenshot from a Remote ELD Log Handover Request Application

400

A User Interface Screenshot from a Remote ELD Log Handover Authorization Application

500

A System Block Diagram Example for a Vehicle Electronic Logging Device (ELD)

600

An Embodiment of a Vehicle Electronic Logging Device (ELD) Management Module

700

An Example of a Portable Electronic Device Incorporating a Vehicle ELD Log Handover Request and/or Authorization Application(s)

800

An Operational Flowchart for a Vehicle Electronic Logging Authorization and Handover System

VEHICLE ELECTRONIC LOGGING AUTHORIZATION AND HANDOVER SYSTEM

BACKGROUND OF THE INVENTION

The present invention generally relates to one or more specialized electronic systems that track, analyze, and enforce commercial vehicle driver safety requirements in a commercial vehicle, which is time-shared and operated by a plurality of commercial drivers. More specifically, various embodiments of the present invention relate to one or more vehicle electronic logging authorization and handover systems associated with federal, national, state, or local commercial vehicle safety requirements and regulatory compliance.

Commercial vehicle drivers, such as truck and bus drivers, are increasingly regulated and required by state, federal, national, and/or municipal governments to take mandatory rests and stops between active driving operations. For example, in the United States, a commercial vehicle driver may be required to take a mandatory thirty-minute break after eight hours of consecutive driving or active on-duty tasks associated with the commercial vehicle (i.e. "30-minute required break per consecutive 8-hour drive"). The commercial vehicle driver may also be required to abide by other mandatory rest requirements, such as a consecutive rest period of thirty-four hours for every non-consecutive sixty hours of active on-duty driving per week (i.e. "60-hour cycle limit"), or a consecutive rest period of ten hours, including eight hours of sleep, for every non-consecutive eleven hours of active on-duty driving (i.e. "11-hour driving limit").

In the past, the mandatory rest and/or sleep durations for commercial vehicle drivers have been conventionally recorded and tracked on paper (i.e. in form of "vehicle driver log" documents) to attempt appropriate compliance with local and/or federal regulations. In recent years, electronic driver activity-logging devices have further assisted commercial vehicle drivers to enter or verify their active driving or resting statuses in electronically-generated driver activity logs. The electronically-generated driver activity logs are typically designed to be periodically audited and reviewed by regulatory authorities and/or fleet operation managers to improve traffic safety and to provide legal compliance. In many cases, the electronically-generated driver activity logs are configured to be tamperproof or "locked" from further adjustments by relevant commercial vehicle driver(s) after a set amount of time (e.g. 12 hours, 24 hours, etc.) has elapsed from the actual time of data recording. The time elapse-triggered "locking" of the electronically-generated driver activity logs is intended to preserve the integrity of the driver activity logs for more robust regulatory compliance associated with mandatory commercial driver resting requirements.

However, conventional paper-based or electronically-generated driver activity logs do not address specialized circumstances in which a multiple number of commercial vehicle drivers share a commercial vehicle for a variety of on-duty driving operations on various time frames (e.g. hourly, daily, weekly, monthly, etc.). For example, it is difficult to generate and maintain accurate and reliable driver activity logs for a multiple number of commercial vehicle drivers who time-share a commercial vehicle, unless novel methods and systems ensure robustness and non-overlapping uniqueness of each electronically-generated driver activity log among the multiple number of commercial vehicle drivers time-sharing the same commercial vehicle.

Therefore, it may be desirable to devise a novel electronic logging authorization and handover system that seamlessly provides commercial vehicle driver log handover requests and authorizations to improve and preserve robustness and non-overlapping uniqueness of electronically-generated commercial vehicle driver log data for a plurality of commercial vehicle drivers who are time-sharing the same commercial vehicle. Furthermore, it may also be desirable to devise a novel method for operating the novel electronic logging authorization and handover system that seamlessly provides commercial vehicle driver log handover requests and authorizations to improve and preserve robustness and non-overlapping uniqueness of electronically-generated commercial vehicle driver log data.

SUMMARY

Summary and Abstract summarize some aspects of the present invention. Simplifications or omissions may have been made to avoid obscuring the purpose of the Summary or the Abstract. These simplifications or omissions are not intended to limit the scope of the present invention.

In one embodiment of the invention, a vehicle electronic logging authorization and handover system is disclosed. This system comprises: a vehicle on-board diagnostics (OBD) device connected to an engine control unit (ECU) or a vehicular control chip in a vehicle to record, diagnose, and generate an engine on or off status, vehicle speed data, acceleration and deceleration data, ambient air temperature data, and other vehicle diagnostics data as a raw OBD data stream; a vehicle electronic logging device (ELD) connected to the vehicle OBD device, wherein the vehicle ELD is configured to generate a driver-specific ELD log that contains a currently logged-in driver's on-duty, off-duty, and resting activities associated with the vehicle; an ELD and OBD data transceiver connected to the vehicle ELD, wherein the ELD and OBD data transceiver is configured to transmit ELD and OBD data to components of the vehicle electronic logging authorization and handover system that are remotely located outside the vehicle; a remote ELD log handover authorization mobile application executed in a first portable electronic device for the currently logged-in driver, whose driving activities are currently interpreted, analyzed, and recorded by the vehicle ELD, wherein the remote ELD log handover authorization mobile application is configured to grant or deny an ELD log handover request from another driver; a remote ELD log handover request mobile application executed in a second portable electronic device for a new driver who is scheduled to time-share and take over the vehicle after the currently logged-in driver, wherein the remote ELD log handover request mobile application is configured to create and transmit the ELD log handover request to the remote ELD log handover authorization mobile application executed in the first portable electronic device, and wherein a successful grant of the ELD log handover request by the first portable electronic device triggers the vehicle ELD to finalize the driver-specific ELD log associated with the currently logged-in driver's on-duty, off-duty, and resting activities associated with the vehicle, sign off the currently logged-in driver, and create a new driver-specific ELD log for the new driver; a commercial fleet operation vehicle electronic logging database and management system that analyzes, stores, and categorizes a plurality of driver-specific ELD logs for a plurality of drivers who time-share the vehicle for each driver's mandatory resting requirement regulatory compliance and monitoring; and a data communication network configured to provide a wireless data information transfer among the vehicle ELD, the ELD and OBD data transceiver, the first portable electronic device, the second portable electronic device, and the commercial fleet operation vehicle electronic logging database and management system.

DETAILED DESCRIPTION

Figure 1:
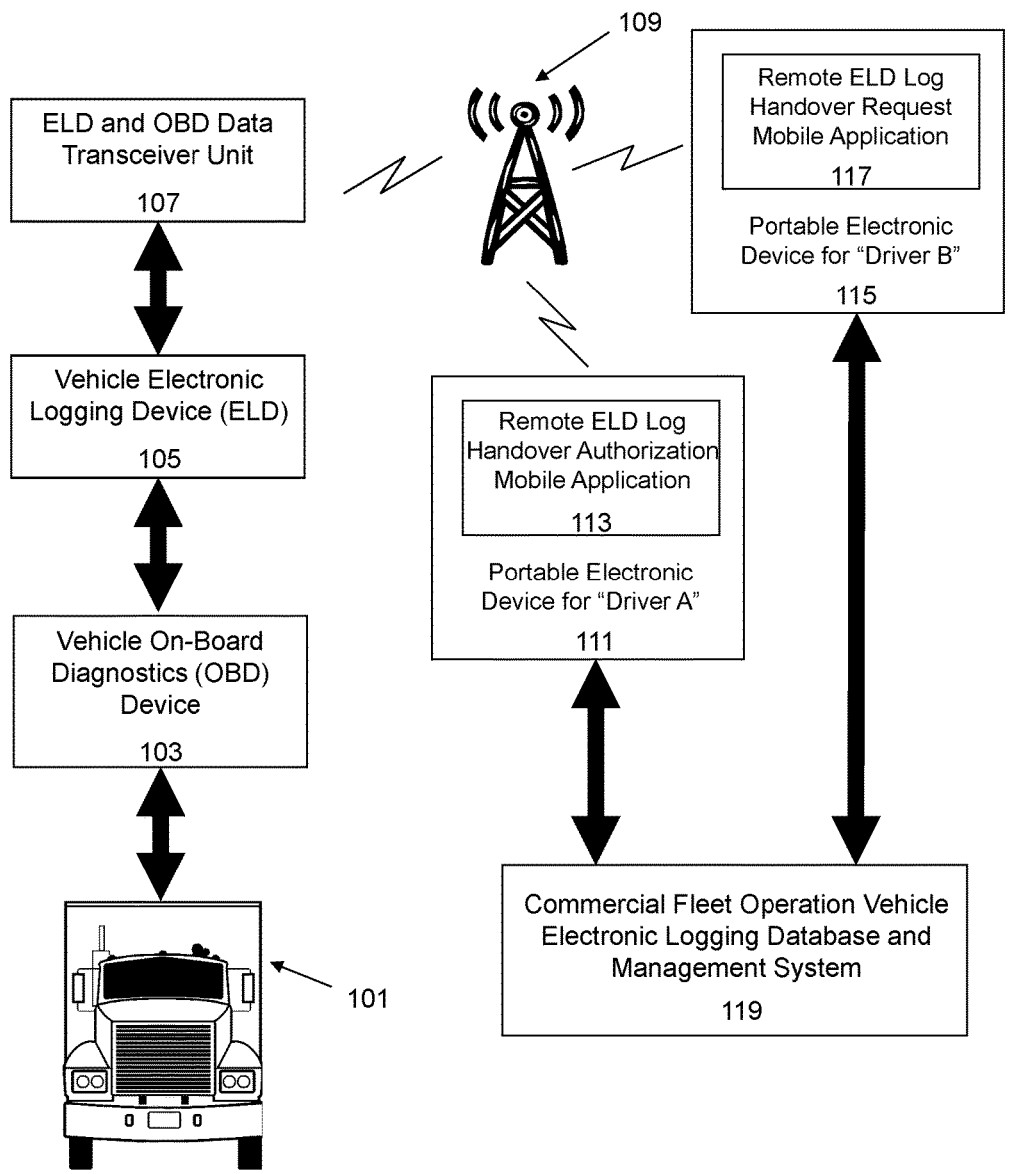
FIG. 1 shows an embodiment of a hardware component block diagram for a vehicle electronic logging authorization and handover system, in accordance with an embodiment of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

The detailed description is presented largely in terms of description of shapes, configurations, and/or other symbolic representations that directly or indirectly resemble one or more vehicle electronic logging authorization and handover systems. These descriptions and representations are the means used by those experienced or skilled in the art to most effectively convey the substance of their work to others skilled in the art.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment. Furthermore, separate or alternative embodiments are not necessarily mutually exclusive of other embodiments. Moreover, the order of blocks in process flowcharts or diagrams representing one or more embodiments of the invention does not inherently indicate any particular order nor imply any limitations in the invention.

For the purpose of describing the invention, a term "vehicle on-board diagnostics (OBD) device" is defined as an electronic device installed in a vehicle to collect and/or analyze a variety of vehicle-related data. In one example, the vehicle OBD device outputs many data parameters in real-time, such as vehicle diagnostic information (e.g. engine temperature, oil level, OBD codes, and etc.), fuel consumption-related information, vehicle speed information, vehicle acceleration and deceleration information (i.e. measured in g-force or in SI units), ambient air temperature information, engine rotation-per-minute (RPM) information, vehicle location information, and other vehicle-related data.

Output data parameters from the vehicle OBD device may be utilized to determine a driver's driving activity status. For example, if the vehicle has a nonzero speed for a certain amount of time while its engine is running, an associated commercial driver's driving activity status may be determined by a vehicle electronic logging device as being engaged in an "on-duty" status. In another example, if the vehicle has a zero speed for a certain amount of time while its engine is idling, the associated commercial driver's driving activity status may be determined by the vehicle electronic logging device as still being engaged in an "on-duty" status. On the other hand, if the vehicle's engine itself is turned off for a certain amount of time, the associated commercial driver's driving activity status may be determined by the vehicle electronic logging device as being "off-duty," inactive, and/or restful from work.

These data parameters may also be correlated to timestamps generated by an electronic clock associated with the vehicle OBD device. In one embodiment of the invention, the data parameters may be generated by the vehicle OBD device in a region-specific, maker-specific, and/or model-specific format, which requires interpretation and conversion to a compatible output format decodable by a vehicle electronic logging device, a mobile application executed on a portable electronic device, and/or a remotely-located commercial fleet operation vehicle electronic logging database and management system.

Furthermore, for the purpose of describing the invention, a term "vehicle electronic logging device," or "ELD," is defined as a specialized driver activity log-generating electronic device connected to a vehicle OBD device. This specialized driver activity log-generating electronic device analyzes real-time OBD output data parameters to objectively derive or confirm an ongoing driver activity in a commercial vehicle. For example, a vehicle ELD can measure and objectively confirm a commercial vehicle driver's on-duty driving by tracking a nonzero vehicle speed data parameter and an engine "on" status signal from the vehicle OBD device, until the commercial vehicle driver stops and turns off the engine.

Similarly, the vehicle ELD can objectively measure and confirm the commercial vehicle driver's off-duty resting period with a system clock and a duration of the engine "off" status signal. Furthermore, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD connected to an in-vehicle data transceiver unit, which further communicates with a remotely-located monitoring station. In a preferred embodiment of the invention, the vehicle ELD is also configured to accept the commercial vehicle driver's manual data entry, which is then automatically compared against and/or merged with machine-determined driver's activity log information derived from the vehicle OBD device to complete synthesis of an electronically-generated driver activity log that incorporates both objective (i.e. machine-determined) and subjective (i.e. driver-entered) information for enhanced details and accuracy.

Moreover, for the purpose of describing the invention, a term "portable electronic device" is defined as a smart phone, a tablet computer, a notebook computer, a special-purpose proprietary ELD data controller device, or another transportable electronic device that can execute a remote ELD log handover request mobile application or a remote ELD log handover authorization mobile application.

Furthermore, for the purpose of describing the invention, a term "remote monitoring station unit" is defined as a vehicle fleet monitoring location for one or more commercial vehicles in operation. Examples of remote monitoring station units include, but are not limited to, a commercial vehicle operation control center, a regulatory traffic safety enforcement agency, a vehicle monitoring service center, and a fleet vehicle employer's information technology (IT) control center. Typically, the remote monitoring station unit is configured to execute and operate a commercial fleet operation vehicle electronic logging database and management system.

In addition, for the purpose of describing the invention, a term "computer server" is defined as a physical computer system, another hardware device, a software module executed in an electronic device, or a combination thereof. Furthermore, in one embodiment of the invention, a computer server is connected to one or more data networks, such as a local area network (LAN), a wide area network (WAN), a cellular network, and the Internet. Moreover, a computer server can be utilized by a vehicle monitoring personnel for gathering and analyzing electronically-generated commercial vehicle driver logs that are stored, updated, and modified by a commercial fleet operation vehicle electronic logging database and management system.

One aspect of the present invention is providing a novel electronic logging authorization and handover system that seamlessly provides commercial vehicle driver log handover requests and authorizations to improve and preserve robustness and non-overlapping uniqueness of electronically-generated commercial vehicle driver log data for a plurality of commercial vehicle drivers who are time-sharing the same commercial vehicle.

Furthermore, another aspect of the present invention is providing a novel method for operating the novel electronic logging authorization and handover system that seamlessly provides commercial vehicle driver log handover requests and authorizations to improve and preserve robustness and non-overlapping uniqueness of electronically-generated commercial vehicle driver log data.

FIG. 1 shows an embodiment of a hardware component block diagram (100) for a vehicle electronic logging authorization and handover system, in accordance with an embodiment of the invention. In a preferred embodiment of the invention, the vehicle electronic logging authorization and handover system comprises an automotive vehicle (101), a vehicle on-board diagnostics (OBD) device (103), a vehicle electronic logging device (ELD) (105), an ELD and OBD data transceiver unit (107), a portable electronic device for "Driver A" (111), a remote ELD log handover authorization mobile application (113) executed on the portable electronic device for "Driver A" (111), a portable electronic device for "Driver B" (115), a remote ELD log handover request mobile application (117) executed on the portable electronic device for "Driver B" (115), a commercial fleet operation vehicle electronic logging database and management system (119), and a wired and/or wireless data network (109).

In the preferred embodiment of the invention, the automotive vehicle (101) is a truck, a van, a bus, or another commercial operation-registered vehicle, which is typically utilized for commercial transport of freight and/or passengers that involve state, federal, municipal, and/or corporate regulations for commercial vehicle driver rest requirements between on-duty driving activities. In another embodiment of the invention, the automotive vehicle (101) may be a private vehicle (i.e. not registered as a commercially-operated vehicle), which is shared among a plurality of drivers via car ride-sharing services or passenger transport services.

Furthermore, the vehicle OBD device (103) is an electronic device installed in the automotive vehicle (101) to collect and/or analyze a variety of vehicle-related data, including engine on/off status, engine temperature, OBD fault codes, speed, acceleration, ambient air temperature, engine rotation-per-minute (RPM), vehicle location, and other vehicle-related output parameters generated by an engine control unit (ECU), a transmission control module (TCM), or another electronic device connected to the vehicle OBD device (103). In the preferred embodiment of the invention as shown in FIG. 1, output data parameters from the vehicle OBD device (103) are utilized to determine a driver's driving activity status by the vehicle electronic logging device (ELD) (105).

For example, if the automotive vehicle (101) has a non-zero speed for a particular amount of time while its engine is running, the driver's driving activity status is analyzed, determined, and recorded by the vehicle ELD (105) as being engaged in an "on-duty" status. The vehicle ELD (105) is capable of objectively determining and confirming the driver's "on-duty" or active driving status by analyzing the incoming machine-generated vehicle-related output parameters in real time. The record generated and stored by the vehicle ELD (105) becomes an electronic driver activity log (e.g. active, inactive, resting, sleeping, etc.) correlated to a system time clock. Moreover, in the preferred embodiment, the vehicle ELD (105) also enables the driver to manually enter or describe his or her driving status (e.g. active, inactive, resting, sleeping, etc.) correlated to the system time clock. Preferably, the vehicle ELD (105) accepts the driver's manual data entry to compare against and/or merge with machine-determined driver's activity log information derived from the vehicle OBD device (103), and completes synthesis of the electronically-generated driver activity log that incorporates both objective (i.e. machine-determined) and subjective (i.e. driver-entered) information for enhanced details and accuracy.

In another example, if the automotive vehicle (101) has a zero speed for a certain amount of time while its engine is idling, the associated commercial driver's driving activity status may be determined by the vehicle ELD (105) as still being engaged in an "on-duty" status, which counts toward the driver's on-the-job active hours, and not toward the mandatory rest period. On the other hand, if the vehicle's engine itself is turned off for a certain amount of time, the associated driver's driving activity status may be determined by the vehicle ELD (105) as being "off-duty," inactive, and/or restful from work, and recorded by the vehicle ELD (105) as part of the mandatory rest period. In the preferred embodiment of the invention, the vehicle ELD (105) is configured to associate and/or record timestamps generated by a system clock with durations and changes in each driving activity status, which also become part of the electronically-generated driving activity logs for a plurality of drivers that time-share the automotive vehicle (101).

Furthermore, the vehicle ELD (105), as shown in FIG. 1, is a specialized driver activity log-generating electronic device connected to the vehicle OBD device (103). In the preferred embodiment, the vehicle ELD (105) is a discrete piece of hardware device operatively connected to the vehicle OBD device (103) via a physical cable or a wireless communication protocol. In another embodiment, the vehicle ELD (105) is an integrated device that incorporates the vehicle OBD device (103) within its physical casing.

In the preferred embodiment of the invention, the vehicle ELD (105) is configured to analyze real-time OBD output data parameters to objectively derive or confirm an ongoing driver activity in the automotive vehicle (101). For example, the vehicle ELD (105) can measure and objectively confirm a commercial vehicle driver's on-duty driving by tracking a nonzero vehicle speed data parameter and an engine "on" status signal from the vehicle OBD device, until the commercial vehicle driver stops and turns off the engine.

Similarly, the vehicle ELD (105) can objectively measure and confirm the commercial vehicle driver's off-duty resting period with a system clock and a duration of the engine "off" status signal. Furthermore, regulatory compliance related to a required duration of the commercial vehicle driver's rest can also be tracked and alerted to appropriate authorities (e.g. local, national, and/or federal traffic safety enforcement agencies, fleet managers, etc.) by the vehicle ELD (105) connected to the in-vehicle ELD and OBD data transceiver unit (107). The in-vehicle ELD and OBD data transceiver unit (107) is configured to communicate wirelessly with portable electronic devices and/or computer servers via a cellular network, a satellite network, a wireless LAN, another wireless data network, or a combination thereof, wherein the portable electronic devices and/or the computer servers are operated by a remote monitoring station and/or a plurality of drivers and authorities, as shown in FIG. 1.

Continuing with the preferred embodiment of the invention as shown in FIG. 1, the portable electronic device for "Driver A" (111) is a smart phone, a tablet computer, a laptop computer, a specialized proprietary commercial fleet management electronic device, or another portable electronic device, which is configured to execute a remote ELD log handover authorization mobile application (113) in a CPU/APU (i.e. a central processing unit or an application processing unit) and a memory unit of the portable electronic device for "Driver A" (111). The remote ELD log handover authorization mobile application (113) provides an electronic user interface that displays a current driver log-in status for a time-shared vehicle among a multiple number of time-sharing drivers. If the user (i.e. "Driver A") of the portable electronic device for "Driver A" (111) is also the person indicated as the currently logged-in driver in the vehicle ELD (105) by the remote ELD log handover authorization mobile application (113), then the electronic user interface generated by the remote ELD log handover authorization mobile application (113) on a display screen of the portable electronic device for "Driver A" (111) also includes an ELD log handover authorization interface to another driver (e.g. "Driver B"), if an ELD log handover request is received by the portable electronic device for "Driver A" (111). The portable electronic device for "Driver A" (111) is operatively connected to other elements (e.g. 101, 103, 105, 107, 115, 117, 119, etc.) of the vehicle electronic logging authorization and handover system via the wired and/or wireless data network (109), which may include a cellular network, a satellite network, a wireless LAN, or a combination thereof.

Furthermore, in the preferred embodiment of the invention, a second portable electronic device, illustrated as the portable electronic device for "Driver B" (115) in FIG. 1, is also a smart phone, a tablet computer, a laptop computer, a specialized proprietary commercial fleet management electronic device, or another portable electronic device. The portable electronic device for "Driver B" (115) is configured to execute a remote ELD log handover request mobile application (117) in a CPU/APU and a memory unit of the portable electronic device for "Driver B" (115). The remote ELD log handover request mobile application (117) provides an electronic user interface that displays a current driver log-in status for a time-shared vehicle among a multiple number of time-sharing drivers. If the user (i.e. "Driver B") of the portable electronic device for "Driver B" (115) is not the person indicated as the currently logged-in driver in the vehicle ELD (105) by the remote ELD log handover request mobile application (117), then the electronic user interface generated by the remote ELD log handover request mobile application (117) on a display screen of the portable electronic device for "Driver B" (115) also includes an ELD log handover request interface to request authorization from the currently logged-in driver (e.g. "Driver A") to sign off from the vehicle ELD (105), which allows the vehicle ELD (105) to generate a new ELD log activity specific to "Driver B," if the currently logged-in driver authorizes the ELD log handover.

As shown by the preferred embodiment of the invention illustrated in FIG. 1, the remote ELD log handover authorization mobile application (113), the remote ELD log handover request mobile application (117), and the vehicle ELD (105) can communicate each other directly on a peer-to-peer basis in the wired and/or wireless data network (109). Alternatively, electronic communications and data transfer among the remote ELD log handover authorization mobile application (113), the remote ELD log handover request mobile application (117), and the vehicle ELD (105) can be mediated, managed, or controlled by the commercial fleet operation vehicle electronic logging database and management system (119), which is typically executed and hosted by one or more computer servers in a remote monitoring station. For example, the commercial fleet operation vehicle electronic logging database and management system (119) may have data correction or overriding privileges to amend erroneous ELD log entries before or after the data lockout period for recent ELD log entries generated by the vehicle ELD (105) or by portable electronic devices operated by vehicle time-sharing drivers. In another example, the commercial fleet operation vehicle electronic logging database and management system (119) may intervene, overtake, or correct communication disruptions or no responses between the remote ELD log handover request mobile application (117) and the remote ELD log handover authorization mobile application (113), if a particular time-sharing vehicle driver fails to respond to another driver's repeated requests to sign off and handover the ELD log status to the particular time-sharing vehicle driver.

It should be noted that federal, state, municipal, and/or corporate regulations may require each commercial vehicle driver to finalize his or her on-duty ELD log activities within a defined time limit (e.g. within 24 hours of on-duty vehicle operation, etc.) before freezing and locking the contents of the ELD logs from additional modifications to preserve the data integrity from unauthorized or undesirable retroactive alterations. Therefore, the vehicle electronic logging authorization and handover system is particularly advantageous in situations where a time-sharing vehicle driver forgets to log off from the vehicle ELD (105) after his or her on-duty assignments utilizing the automotive vehicle (101) is completed. If the time-sharing vehicle driver is not properly logged off from the vehicle ELD (105), the corresponding ELD log for this time-sharing vehicle driver may not terminate properly even at the end of his or her on-duty assignment, and erroneously roll into another time-sharing vehicle driver's records, which causes significant inaccuracies in driver-specific ELD log generation for a plurality of time-sharing vehicle drivers.

The vehicle electronic logging authorization and handover system, in accordance with various embodiments of the present invention, prevents or even reverses such erroneous ELD log generations and erroneous data pairing between the OBD output parameters and a particular time-shared vehicle driver by empowering each time-sharing vehicle driver to request ELD log handover from the currently logged-in driver, if the currently logged-in driver has accidentally forgotten to log out of the vehicle ELD (105) after his or her vehicle operation time slot. Even if the currently logged-in driver has already exited and moved far away from the automotive vehicle (101) and the vehicle ELD (105), the currently logged-in driver is able to authorize the ELD log signoff and handover remotely by issuing an electronic authorization via the remote ELD log handover authorization mobile application (113) executed on the portable electronic device (i.e. 111). The novel and unique ability to request or grant the transfer of driver-specific ELD log generation among a plurality of remotely-located drivers for a time-shared vehicle via ELD log handover request or authorization mobile applications reduces incidents of erroneous ELD log generations. The novel vehicle electronic logging authorization and handover system, as shown in various embodiments of the present invention, also minimizes the need for retroactive driver activity log entry corrections by a fleet management personnel operating the commercial fleet operation vehicle electronic logging database and management system (119).

Figure 2:
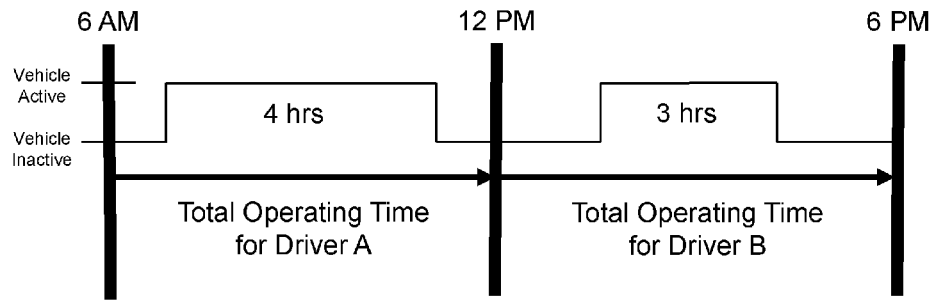
FIG. 2 shows a timing diagram example for a vehicle ELD-equipped and time-shared vehicle operation between two drivers, in accordance with an embodiment of the invention.

FIG. 2 shows a timing diagram example (200) for a vehicle ELD-equipped and time-shared vehicle operation between two drivers, in accordance with an embodiment of the invention. In this time diagram example (200) of FIG. 2, the vehicle ELD (e.g. 105 of FIG. 1) is capable of determining and recording a particular driver's vehicle on-duty and off-duty activities among a plurality of time-sharing drivers.

For example, if "Driver A" has designated work hours from 6 am to 12 pm, and if the time-shared vehicle had its engine on only between 7 am to 11 am, then the vehicle ELD may determine that "Driver A" had an active on-duty period only between 7 am to 11 am, as shown in FIG. 2. On the other hand, if the time-shared vehicle had its engine off between 6 am and 7 am, and also between 11 am and 12 pm, as shown in FIG. 2, then the vehicle ELD may also determine that "Driver A" had an inactive or "off-duty" periods during those two time slots. In some instances, these two inactive or "off-duty" periods may count towards "Driver A's" mandatory rest requirements between on-duty driving activities for regulatory compliance.

Similarly, in the timing diagram example (200) of FIG. 2, if "Driver B" has designated work hours from 12 pm to 6 pm, subsequent to "Driver A's" work hours, and if the time-shared vehicle had its engine on only between 1:30 pm to 4:30 pm, then the vehicle ELD may determine that "Driver B" had an active on-duty period during that timeframe, as shown in FIG. 2. On the other hand, if the time-shared vehicle had its engine off between 12 pm and 1:30 pm, and also between 4:30 pm and 6 pm, as shown in FIG. 2, then the vehicle ELD may also determine that "Driver B" had an inactive or "off-duty" periods during those two time slots. In some instances, these two inactive or "off-duty" periods may count towards "Driver B's" mandatory rest requirements between on-duty driving activities for regulatory compliance. In the preferred embodiment of the invention, the vehicle ELD (e.g. 105 of FIG. 1) is capable of generating and recording a plurality of driver-specific driver activity logs that can be further analyzed, modified, and processed by the commercial fleet operation vehicle electronic logging database and management system (e.g. 119 of FIG. 1).

Figure 3:
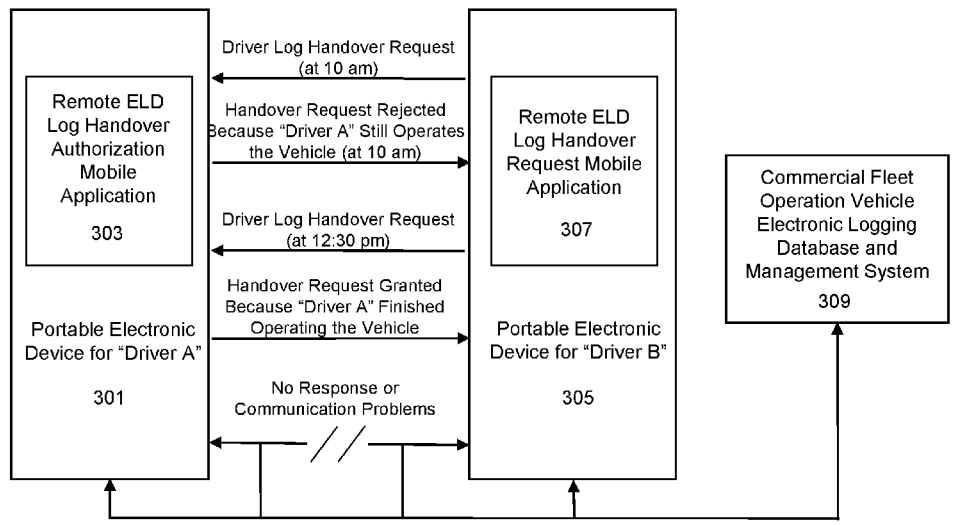
FIG. 3 shows an example of vehicle log handover requests and responses for a vehicle ELD-equipped shared vehicle between two drivers, in accordance with an embodiment of the invention.

FIG. 3 shows an example (300) of vehicle log handover requests and responses for a vehicle ELD-equipped shared vehicle between two drivers, in accordance with an embodiment of the invention. In this example (300), a portable electronic device for "Driver A" (301) is a smart phone, a tablet computer, a laptop computer, a specialized proprietary commercial fleet management electronic device, or another portable electronic device, which is configured to execute a remote ELD log handover authorization mobile application (303) in a CPU/APU (i.e. a central processing unit or an application processing unit) and a memory unit of the portable electronic device for "Driver A" (301).

The remote ELD log handover authorization mobile application (303) provides an electronic user interface that displays a current driver log-in status for a time-shared vehicle among a multiple number of time-sharing drivers. If the user (i.e. "Driver A") of the portable electronic device for "Driver A" (301) is also the person indicated as the currently logged-in driver in the vehicle ELD (e.g. 105 of FIG. 1) by the remote ELD log handover authorization mobile application 303), then the electronic user interface generated by the remote ELD log handover authorization mobile application (303) on a display screen of the portable electronic device for "Driver A" (301) also includes an ELD log handover authorization interface to another driver (e.g. "Driver B"), if an ELD log handover request is received by the portable electronic device for "Driver A" (301).

In the example (300) shown in FIG. 3, the portable electronic device for "Driver A" (301) is operatively connected to the vehicle ELD (e.g. 105 of FIG. 1), a portable electronic device for "Driver B" (305), a commercial fleet operation vehicle electronic logging database and management system (309), and other components of the vehicle electronic logging authorization and handover system via a wired and/or wireless data network, which may include a cellular network, a satellite network, a wireless LAN, or a combination thereof.

Furthermore, as illustrated in the example (300) of FIG. 3, the portable electronic device for "Driver B" (305) is also a smart phone, a tablet computer, a laptop computer, a specialized proprietary commercial fleet management electronic device, or another portable electronic device. The portable electronic device for "Driver B" (305) is configured to execute a remote ELD log handover request mobile application (307) in a CPU/APU and a memory unit of the portable electronic device for "Driver B" (305). The remote ELD log handover request mobile application (307) provides an electronic user interface that displays a current driver log-in status for a time-shared vehicle among a multiple number of time-sharing drivers. If the user (i.e. "Driver B") of the portable electronic device for "Driver B" (305) is not the person indicated as the currently logged-in driver in the vehicle ELD (305) by the remote ELD log handover request mobile application (307), then the electronic user interface generated by the remote ELD log handover request mobile application (307) on a display screen of the portable electronic device for "Driver B" (305) also includes an ELD log handover request interface to request authorization from the currently logged-in driver (e.g. "Driver A") to sign off from the vehicle ELD (e.g. 105 of FIG. 1), which allows the vehicle ELD to generate a new ELD log activity specific to "Driver B," if the currently logged-in driver authorizes the ELD log handover.

Continuing with FIG. 3, the example (300) illustrates that the ELD driver log handover request is generated by the remote ELD log handover request mobile application (307), and is transmitted from Portable Electronic Device for "Driver B" (305) to Portable Electronic Device for "Driver A" (301) at 10 am, when "Driver A" is still operating the time-shared vehicle. In this example (300), the ELD driver log handover request is rejected by the remote ELD log handover authorization mobile application (303) executed in the Portable Electronic Device for "Driver A" (301), because "Driver A" is still operating the time-shared vehicle, and a signoff/handover from the ongoing "Driver A"-specific driver log generation would be inappropriate and erroneous. This handover request rejection may be automatically machine-generated from the remote ELD log handover authorization mobile application (303), based on a machine-level understanding of "Driver A's" operating schedule in the current timeframe (e.g. 10 am). Alternatively, the handover request rejection may be manually generated by "Driver A" via a handover rejection button press, a handover rejection code entry, or another method of signaling the handover request rejection on the ELD log handover authorization interface displayed on the portable electronic device for "Driver A" (301) by the remote ELD log handover authorization mobile application (303).

Then, when a second request is transmitted for the ELD log handover at 12:30 pm from the portable electronic device for "Driver B" (305) to the portable electronic device for "Driver A" (301), this ELD driver log handover request is granted and processed by the remote ELD log handover authorization mobile application (303) executed in the Portable Electronic Device for "Driver A" (301), because "Driver A" has finished operating the time-shared vehicle at 12 pm, and a signoff/handover from the ongoing "Driver A"-specific driver log generation is not only justified but is operationally necessary to reverse inadvertent errors in the "Driver A"-specific driver log entries that could have been avoided if "Driver A" signed off from the vehicle ELD at 12 pm.

The handover request authorization granting may be automatically machine-generated from the remote ELD log handover authorization mobile application (303), based on the machine-level understanding of "Driver A's" operating schedule in the current timeframe (i.e. how the current time at 12:30 pm is past "Driver A's" vehicle time-share operating hours). Alternatively, the handover request authorization may be manually generated by "Driver A" via a handover authorization button press, a handover authorization code entry, or another method of signaling the handover request authorization on the ELD log handover authorization interface displayed on the portable electronic device for "Driver A" (301) by the remote ELD log handover authorization mobile application (303).

Furthermore, in the example (300) as illustrated in FIG. 3, if "Driver A" or the remote ELD log handover authorization mobile application (303) does not respond to "Driver B's" request for ELD log handover authorization generated in the remote ELD log handover request mobile application (307) within a defined amount of time (e.g. one hour, three hours, twelve hours, etc.), then a fleet operation personnel (i.e. via an electronic user interface connected to the commercial fleet operation vehicle electronic logging database and management system (309)) can intervene, correct, and/or override "Driver A's" ELD log handover authorization privileges to enable and ensure that "Driver B" can initiate, correct, and/or sign into the vehicle ELD for "Driver B"-specific driver log generation during his or her scheduled operating hours.

The remote ELD log handover authorization mobile application (303), the remote ELD log handover request mobile application (307), the commercial fleet operation vehicle electronic logging database and management system (309), and the vehicle ELD may communicate each other directly on a peer-to-peer basis in the wired and/or wireless data network. Alternatively, electronic communications and data transfer among the remote ELD log handover authorization mobile application (303), the remote ELD log handover request mobile application (307), and the vehicle ELD can be mediated, managed, or controlled by the commercial fleet operation vehicle electronic logging database and management system (309), which is typically executed and hosted by one or more computer servers in a remote monitoring station. For example, the commercial fleet operation vehicle electronic logging database and management system (309) may have data correction or overriding privileges to amend erroneous ELD log entries before or after the data lockout period for recent ELD log entries generated by the vehicle ELD or by portable electronic devices operated by vehicle time-sharing drivers.

In another example, the commercial fleet operation vehicle electronic logging database and management system (309) may intervene, overtake, or correct communication disruptions or no responses between the remote ELD log handover request mobile application (307) and the remote ELD log handover authorization mobile application (303), if a particular time-sharing vehicle driver fails to respond to another driver's repeated requests to sign off and handover the ELD log status to the particular time-sharing vehicle driver.

For commercial vehicle operations on public roads, federal, state, municipal, and/or corporate regulations may require each commercial vehicle driver to finalize his or her on-duty ELD log activities within a defined time limit (e.g. within 24 hours of on-duty vehicle operation, etc.) before freezing and locking the contents of the ELD logs from additional modifications to preserve the data integrity from unauthorized or undesirable retroactive alterations. Therefore, the vehicle electronic logging authorization and handover system, in accordance with various embodiments of the present invention, is particularly advantageous in situations where a time-sharing vehicle driver forgets to log off from the vehicle ELD after his or her on-duty assignments utilizing the automotive vehicle is completed. If the time-sharing vehicle driver is not properly logged off from the vehicle ELD, the corresponding ELD log for this time-sharing vehicle driver may not terminate properly even at the end of his or her on-duty assignment, and instead roll into another time-sharing vehicle driver's records erroneously. Without the novel vehicle electronic logging authorization and handover system, as described in various embodiments of the invention, this erroneous driver activity log generation can cause significant inaccuracies in driver-specific ELD log generation for a plurality of time-sharing vehicle drivers.

The vehicle electronic logging authorization and handover system is configured to prevent or even reverse such erroneous ELD log generations and erroneous data pairing between the OBD output parameters and a particular time-shared vehicle driver by empowering each time-sharing vehicle driver to request ELD log handover from the currently logged-in driver, if the currently logged-in driver has accidentally forgotten to log out of the vehicle ELD after his or her vehicle operation time slot. Even if the currently logged-in driver has already exited and moved far away from the automotive vehicle and the vehicle ELD, the currently logged-in driver is able to authorize the ELD log signoff and handover remotely by issuing an electronic authorization via the remote ELD log handover authorization mobile application (303) executed on the portable electronic device (301). The novel and unique ability to request or grant the transfer of driver-specific ELD log generation among a plurality of remotely-located drivers for a time-shared vehicle via ELD log handover request or authorization mobile applications reduces incidents of erroneous ELD log generations. The novel vehicle electronic logging authorization and handover system, as shown in various embodiments of the present invention, also minimizes the need for retroactive driver activity log entry corrections by a fleet management personnel operating the commercial fleet operation vehicle electronic logging database and management system (309).

Figure 4:
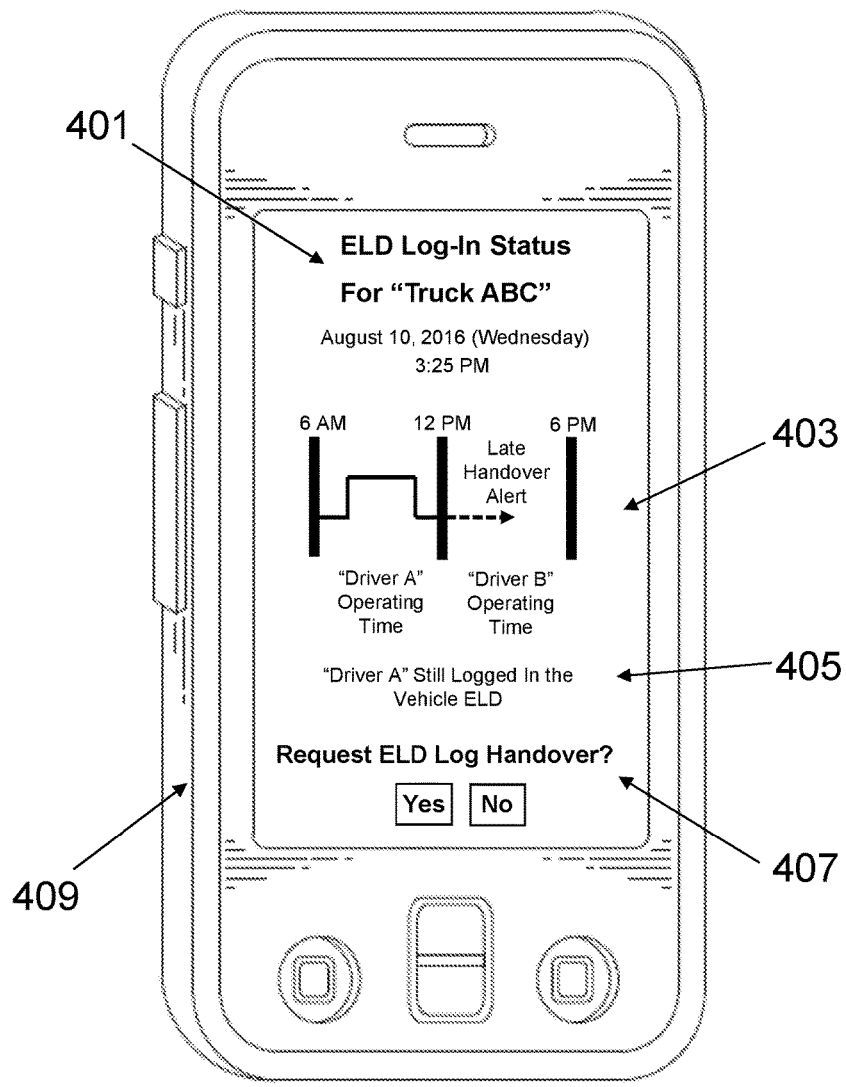
FIG. 4 shows a user interface screenshot from a remote ELD log handover request application, in accordance with an embodiment of the invention.

FIG. 4 shows a user interface screenshot (400) from a remote ELD log handover request application executed on a portable electronic device for "Driver B," (409) in accordance with an embodiment of the invention. In this embodiment of the invention, the user interface screenshot (400) shows an electronic user interface (401) that displays current driver log-in status time graph and alert (403) as well as current driver log-in status textual information (405). In the user interface screenshot (400) of FIG. 4, the current driver log-in status time graph and alert (403) graphically indicate two time-shared drivers' (i.e. "Driver A's" and "Driver B's") allotted operating times on a time-shared vehicle (i.e. "Truck ABC"). Because "Driver A's" operating time was scheduled to end at 12 pm, the current driver log-in status time graph and alert (403) generates a "late handover alert," as the time has elapsed well into "Driver B's" allotted operating time while "Driver A" has not signed off from "Truck ABC's" vehicle electronic logging device (ELD). This "late handover alert" may be graphically represented by the electronic user interface (401), and may also be synthesized as an aural alert or an email alert.

Furthermore, the electronic user interface (401) of the portable electronic device for "Driver B" (409) may also display additional textual details as the current driver log-in status textual information (405), as shown by the user interface screenshot (400) in FIG. 4. Moreover, the electronic user interface (401) also incorporates an ELD log handover request interface (407), which is configured to enable "Driver B" to request the ELD log handover from "Driver A," who may have forgotten to log out or sign off from "Truck ABC's" vehicle ELD after his or her vehicle operation. As shown in the user interface screenshot (400) in FIG. 4, the ELD log handover request interface (407) may be an ELD log handover request button or another method of triggering the ELD log handover request, such as entering a special code, issuing a voice command, or completing a finger-swipe gesture command.

Figure 5:
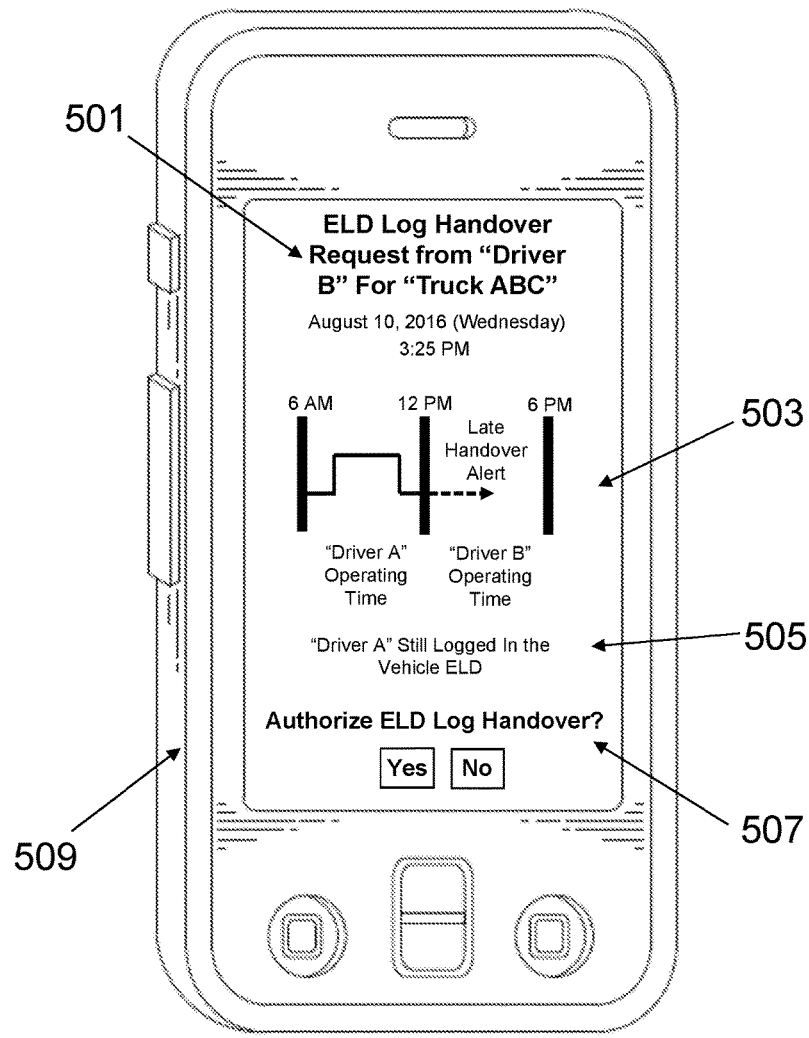
FIG. 5 shows a user interface screenshot from a remote ELD log handover authorization application, in accordance with an embodiment of the invention.

FIG. 5 shows a user interface screenshot (500) from a remote ELD log handover authorization application executed on a portable electronic device for "Driver A," (509) in accordance with an embodiment of the invention. In this embodiment of the invention, the user interface screenshot (500) shows an electronic user interface (501) that displays current driver log-in status time graph and alert (503) as well as current driver log-in status textual information (505). In the user interface screenshot (500) of FIG. 5, "Driver B" has already made a request to "Driver A" to sign off and handover the ELD log to "Driver B" for "Truck ABC," which is a time-shared vehicle.

Furthermore, the current driver log-in status time graph and alert (503) graphically indicate two time-shared drivers' (i.e. "Driver A's" and "Driver B's") allotted operating times on the time-shared vehicle (i.e. "Truck ABC"). Because "Driver A's" operating time was scheduled to end at 12 pm, the current driver log-in status time graph and alert (503) generates a "late handover alert," as the time has elapsed well into "Driver B's" allotted operating time while "Driver A" has not signed off from "Truck ABC's" vehicle electronic logging device (ELD). This "late handover alert" may be graphically represented by the electronic user interface (501), and may also be synthesized as an aural alert or an email alert.

Moreover, the electronic user interface (501) of the portable electronic device for "Driver A" (509) may also display additional textual details as the current driver log-in status textual information (505), as shown by the user interface screenshot (500) in FIG. 5. In addition, the electronic user interface (501) also incorporates an ELD log handover authorization interface (507), which is configured to enable "Driver A" to grant and authorize the ELD log handover to "Driver B," who has begun operating the "Truck ABC" from 12 pm and needs to log into the vehicle ELD for Driver B-specific driver activity log generation after "Driver A" completes the ELD log handover to "Driver B" from the vehicle ELD. As shown in the user interface screenshot (500) in FIG. 5, the ELD log handover authorization interface (507) may be an ELD log handover authorization button or another method of triggering the ELD log handover authorization, such as entering a special code, issuing a voice command, or completing a finger-swipe gesture command.

Figure 6:
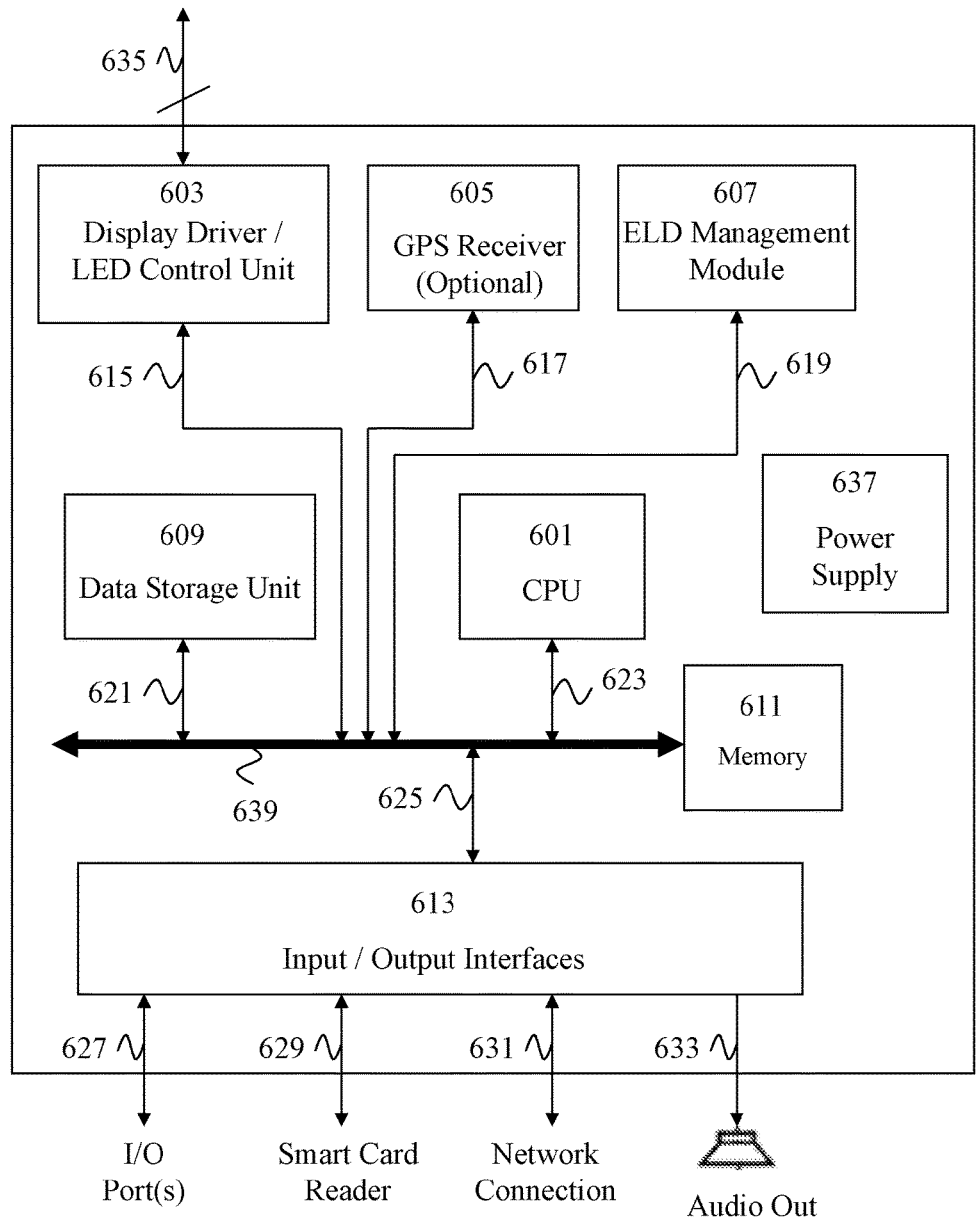
FIG. 6 shows a system block diagram example for a vehicle electronic logging device (ELD), in accordance with an embodiment of the invention.

FIG. 6 shows a system block diagram example (600) for a vehicle electronic logging device (ELD), which is a component in the vehicle electronic logging authorization and handover system, in accordance with an embodiment of the invention. In this system block diagram example (600), the vehicle ELD (e.g. 105 of FIG. 1) includes a CPU (601), a memory unit (611), a data storage unit (609), a display driver and/or LED control unit (603), an ELD management module (607), an input/output interfaces (613), and a power supply (637). Optionally, the vehicle ELD also has a global positioning system (GPS) receiver (605).

Figure 7:
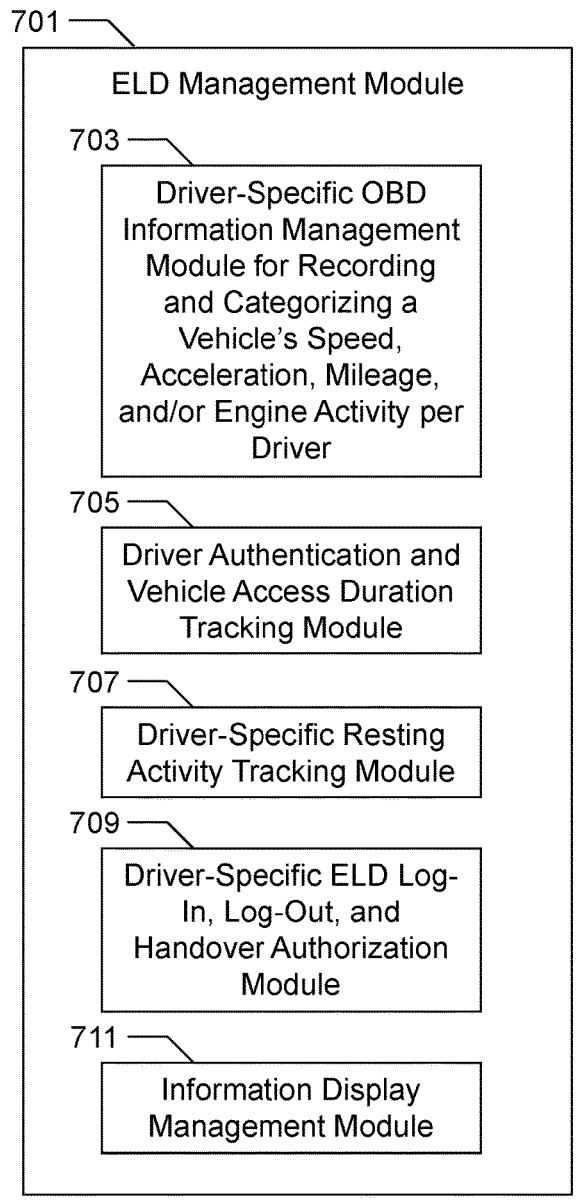
FIG. 7 shows an embodiment of a vehicle electronic logging device (ELD) management module, in accordance with an embodiment of the invention.

In one embodiment of the invention, these hardware system blocks (e.g. 600) for the vehicle ELD are configured to execute the ELD management module (607) in the CPU (601) and the memory unit (611), wherein the ELD management module (607) contains a plurality of logical blocks, as exemplified by FIG. 7. In another embodiment of the invention, the ELD management module (607) may be hard-coded into a semiconductor chip as a hardware component within the hardware system blocks of the vehicle ELD (e.g. 105 in FIG. 1). Furthermore, the vehicle ELD may also incorporate a wireless transceiver for ELD and OBD data communication with a plurality of driver-specific portable electronic devices and a commercial fleet operation vehicle electronic logging database and management system via a wireless data network. Alternatively, the vehicle ELD may be operatively connected to a separate wireless transceiver unit for ELD and OBD data communication with various components of the vehicle electronic logging authorization and handover system. The wireless transceiver may be configured to transmit or receive data packets via a cellular network, a satellite network, a land-mobile radio network, or via another wireless communication method.

Continuing with FIG. 6, the data storage unit (609) in the vehicle ELD can store OBD data streams from a vehicle OBD device and any information entered by a time-sharing vehicle driver or a commercial fleet operation personnel. Furthermore, the ELD management module (607) executed in the vehicle ELD can retrieve the OBD data streams, environmental sensor readings associated with the time-shared vehicle, and other driver activity-related information to calculate and/or determine current status of a specific driver activity (e.g. actively driving, passively idling, resting, signing off from an on-duty status, etc.). For example, vehicle speed, acceleration, engine on/off status, driver position/location sensing within the time-shared vehicle (e.g. driver's seat, passenger seat, sleeper cabin, outside the vehicle, etc.), and other vehicle OBD and sensor output parameters can be utilized by the ELD management module (607) to determine the current status of the specific driver activity and generate the driver-specific ELD log.

In some embodiments of the invention, these vehicle OBD and sensor output parameters may also be utilized to detect a potential damage or endangerment to a fragile cargo item, excessively cold or hot temperatures inside the time-shared vehicle, extreme humidity or dryness in the time-shared vehicle's cargo space, or excessive fuel consumption by a particular driver. Any of these detected information during a particular driver's operating hours may be synthesized and recorded as part of the driver-specific ELD log, if desired by the commercial fleet operation personnel or government regulators.

In some instances, the vehicle ELD may integrate or connect to location tracking unit(s), such as the GPS receiver (605) in FIG. 6. An abrupt outage or improper GPS coordinate readings for the time-shared vehicle from the GPS receiver (605) or another location tracking unit may indicate a potential endangerment to the currently logged-in driver, which can be detected and alerted to the commercial fleet operation personnel or the government regulators via a wireless data network. The ELD management module (607) can be configured to generate textual, aural, or multimedia alerts to the currently logged-in driver, the commercial fleet operation personnel, and/or the government regulators, based on alerts determined by the vehicle ELD.

Furthermore, the vehicle ELD may also generate alerts or indicate monitoring statuses via a plurality of LED indicator lights connected to the display driver and/or LED control unit (603) and a display driver output (635). Moreover, various hardware components (i.e. 601, 603, 605, 607, 609, 611, 613, 637) of the vehicle ELD can transmit and receive data among each other via an internal bus (639) and various electrical connections (615, 617, 619, 621, 623, 625).

In the embodiment of the invention as shown in FIG. 6, the vehicle ELD also includes the power supply unit (637), which supplies electrical power to various hardware components (i.e. 601, 603, 605, 607, 609, 611, 613, 637) in the hardware system blocks of the vehicle ELD. Furthermore, the vehicle ELD may also include the input/output interfaces (613) that can accommodate data communication for I/O ports (627), smart card readers (629), network connections (631), and an audio out connection (633) to a speaker. As shown in the system block diagram example (600), in this embodiment of the invention, the input/output interfaces (613) are operatively connected to the internal bus (639), which can communicate with any other components in the vehicle ELD.

FIG. 7 shows an example (700) of a vehicle electronic logging device (ELD) management module (701), which corresponds to element 607 in FIG. 6, in one embodiment of the invention. The vehicle ELD management module (701) is typically integrated into a vehicle electronic logging device (ELD), which is typically a vehicle-installed specialized hardware device that connects to a vehicle OBD device and an ELD/OBD data transceiver unit, as previously shown in FIG. 1.

In a preferred embodiment of the invention, the vehicle ELD management module (701) comprises a driver-specific OBD information management module (703) for recording and categorizing a vehicle's speed, acceleration, mileage, and/or engine activity per driver. An OBD data stream which contains vehicular dynamics, engine on/off statuses, and fuel consumption information can be stored, categorized, and extracted in the driver-specific OBD information management module (703).

The vehicle ELD management module (701) also includes a driver authentication and vehicle access duration tracking module (705). This module is configured to authenticate a particular driver operating a time-shared vehicle among a plurality of registered drivers in the vehicle ELD, and is also configured to track and record the particular driver's vehicle access duration. The particular driver's vehicle access duration may be inferred by the driver authentication timing with the vehicle ELD, speedometer readings, and engine on/off statuses that suggest the particular driver's on-duty driving activities or resting periods. Furthermore, the particular driver's vehicle access duration can be made more precise by manual or machine-based automated entry of the particular driver's expected operating hours in the time-shared vehicle.

Furthermore, the vehicle ELD management module (701) also incorporates a driver-specific resting activity tracking module (707), which is configured to determine, track, and record a driver's resting periods based on machine-generated vehicle data parameters, such as motion sensor values in the sleeper cabin, driver authentication timing with the vehicle ELD, speedometer readings, engine on/off statuses, and driver operation schedule entries. In addition, the driver's resting periods can be tracked more accurately if the driver's expected resting schedules are uploaded to the driver-specific resting activity tracking module (707).

Continuing with FIG. 7, the vehicle ELD management module (701) also incorporates a driver-specific ELD log-in, log-out, and handover authorization module (709), which is capable of initiating (i.e. "logging in"), terminating (i.e. "logging out" or signing off), and/or transferring (i.e. "handover") a driver-specific ELD log generation privileges in the vehicle ELD. As described previously in association with FIGS. 1-5, a plurality of drivers who time-share a vehicle can utilize one or more portable electronic devices and corresponding remote ELD log handover mobile applications to request, grant, or deny a driver-specific ELD log handover for the vehicle ELD installed in the time-shared vehicle, even when a particular driver has forgotten to log out of the vehicle ELD after his or her allotted driving operation period and is no longer near the time-shared vehicle.

Moreover, the vehicle ELD management module (701) also includes an information display management module (711). The information display management module (711) is configured to display current driver log-in status time graphs, alerts, textual information, and ELD log handover request or authorization interfaces on a display panel inside the time-shared vehicle, or on one or more display panels connected to portable electronic devices for a plurality of time-shared vehicle drivers. Furthermore, these graphical and textual information associated with the vehicle ELD can also be displayed by the commercial fleet operation vehicle electronic logging database and management system.

In one embodiment of the invention, various modules (703, 705, 707, 709, 711) contained inside the ELD management module (701) may be software elements that are executed in a CPU/APU or a memory unit of a hardware device, such as system block components (e.g. 600 of FIG. 6) of a vehicle electronic logging device (ELD). In another embodiment of the invention, the ELD management module (701) may be a combination of software elements and hardware elements that conceptually constitute various components (703, 705, 707, 709, 711) of the ELD management module (701). Yet in another embodiment of the invention, the ELD management module (701) may be entirely implemented into a semiconductor chip, which makes the ELD management module (701) a system-on-chip (SoC) hardware solution.

Figure 8:
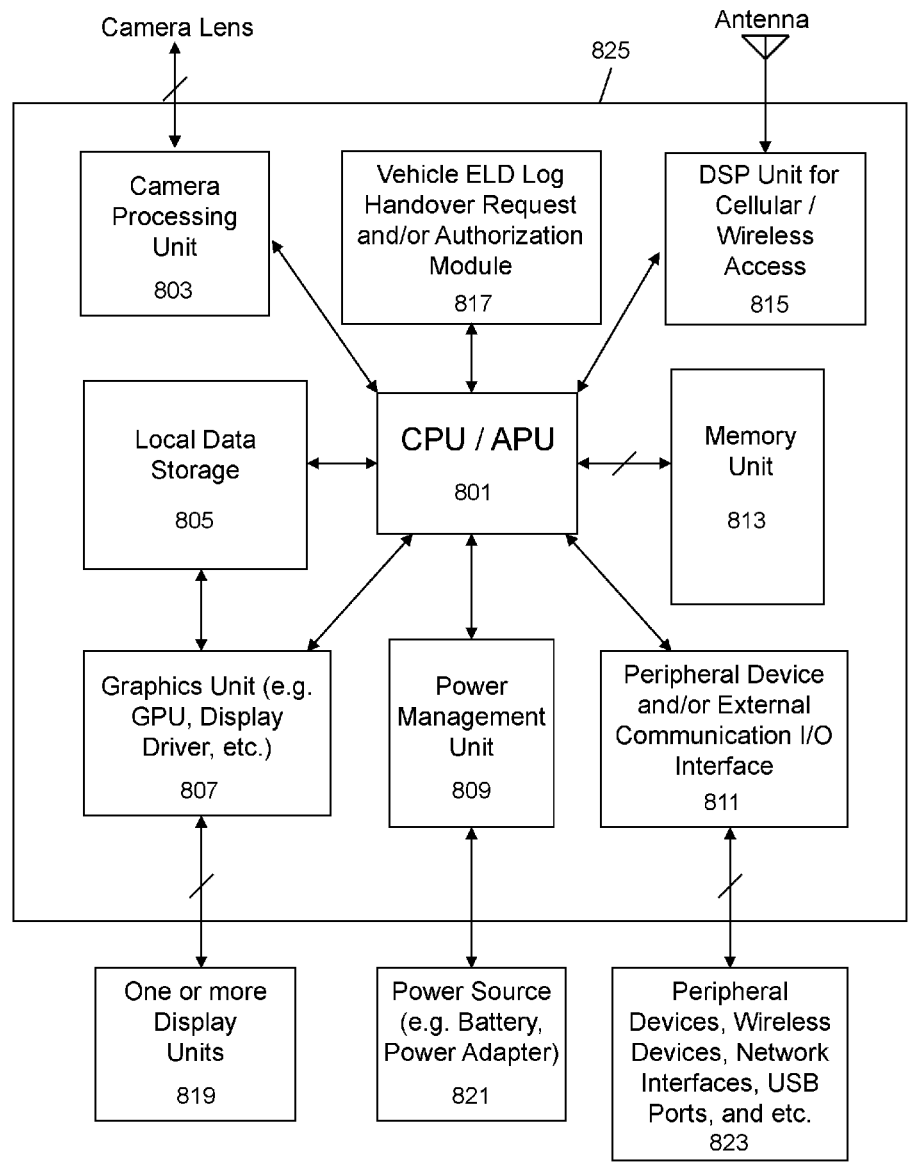
FIG. 8 shows an example of a portable electronic device incorporating a vehicle ELD log handover request and/or authorization application module, in accordance with an embodiment of the invention.

FIG. 8 shows a system block diagram example (800) of a portable electronic device incorporating a vehicle ELD log handover request and/or authorization application module (817), in accordance with an embodiment of the invention. The vehicle ELD log handover request and/or authorization application module (817) contains a remote ELD log handover request mobile application and/or a remote ELD log handover authorization mobile application, which are configured to request, authorize, or deny a time-shared vehicle driver's ELD driver log handover from another time-shared vehicle driver.

In a preferred embodiment of the invention, the portable electronic device may be a smart phone, a tablet computer, a notebook computer, a personal computer, a special-purpose proprietary ELD data controller device, or another transportable electronic device that can execute a remote ELD log handover request mobile application or a remote ELD log handover authorization mobile application in a CPU, an APU, and/or a memory unit of the portable electronic device. The vehicle ELD log handover request and/or authorization application module (817) may comprise software elements (e.g. a remote ELD log handover authorization mobile app, a remote ELD log handover request mobile app, etc.) stored in a non-volatile data storage, or embedded software elements hard-coded and incorporated in a semiconductor chip as a piece of hardware. The portable electronic device is configured to provide vehicle ELD log handover or authorization user interfaces, and may also function as a multi-purpose electronic communication device that provides Internet web browsing, text messaging, email communication, and voice call capabilities.

As shown in the system block diagram example (800) of FIG. 8, the portable electronic device has a CPU or an APU (801), which is operatively connected to a memory unit (813), a local data storage (805), a camera processing unit (803), a graphics unit (807) (e.g. a graphics processor, a display driver, and etc.), a power management unit (809), a peripheral device and/or external communication I/O interface (811), a digital signal processing (DSP) unit for cloud server access (815), the vehicle ELD log handover request and/or authorization application module (817), and a sound unit. These logical units may be placed on a single printed circuit board (825) in one embodiment of the invention, or a plurality of printed circuit boards in another embodiment of the invention.

In the preferred embodiment of the invention, the CPU/APU (801) is configured to control each logical unit operatively (i.e. directly or indirectly) connected to the CPU/APU (801). The memory unit (813) typically comprises volatile memory banks based on DRAM's. In some embodiments of the invention, the memory unit (813) may use non-volatile memory technologies such as SRAM's and/or Flash memory. The memory unit (813) is capable of storing programs and applications which can be executed by the CPU/APU (801), the graphics unit (807), or another logical unit operatively connected to the memory unit (813).

In particular, in the preferred embodiment of the invention, instructions, datasets, and codes originating from the vehicle ELD log handover request and/or authorization application module (817) can be executed on the CPU/APU (801) and the memory unit (813) of the portable electronic device to provide remote ELD log handover request or authorization mobile applications. The vehicle ELD log handover request and/or authorization application module (817) may be a separate standalone logical unit, as shown in FIG. 8, or a collection of software or machine codes associated with the vehicle ELD log handover request and/or authorization applications in the local data storage (805). Preferably, the vehicle ELD log handover request and/or authorization application module (817) contains one or more logical units (e.g. 703, 705, 707, 709, 711) previously described in FIG. 7.

Continuing with FIG. 8, any software and programs executed on the CPU/APU (801) and the memory unit (813) of the portable electronic device may be part of an operating system, or a separate application installed on the operating system of the portable electronic device. Furthermore, the camera processing unit (803) is operatively connected to a camera lens on the portable electronic device, and is able to process image-related data from the camera lens in association with the CPU APU (801) and/or other logical units in the portable electronic device to produce live recorded video information, which may be stored in the local data storage (805). In addition, a microphone operatively connected to the sound unit can produce live recorded audio information, which can also be stored in the local data storage (805).

Moreover, as shown in FIG. 8, the digital signal processing (DSP) unit for cloud server access (815) is operatively connected to an radio frequency (RF) antenna. The DSP unit for cloud server access (815) is generally configured to receive and transmit radio data and/or voice signals wirelessly for a desktop computer, a laptop, a mobile communication device, an electronic goggle, or another suitable electronic system. In addition, the power management unit (809) is operatively connected to a power supply unit and a power source (e.g. battery, power adapter) (821), and the power management unit (809) generally controls power supplied to the portable electronic device and its logical units. Moreover, the peripheral device and/or external communication I/O interface (811) as shown in FIG. 8 can be operatively connected to one or more peripheral devices, wireless devices, USB ports, and other external data communication media (823).

Continuing with FIG. 8, in the preferred embodiment of the invention, the graphics unit (807) in the system block diagram example (800) for the portable electronic device comprises a graphics processor, a display driver, a dedicated graphics memory unit, and/or another graphics-related logical components. In general, the graphics unit (807) is able to process and communicate graphics-related data with the CPU/APU (801), the display driver, and/or the dedicated graphics memory unit. The graphics unit (807) is also operatively connected to one or more display units (819). In addition, the CPU/APU (801) may be operatively connected to the sound unit which contains audio-related logical components for generation or recording of audio data from a microphone operatively connected to the portable electronic device.

Figure 9:
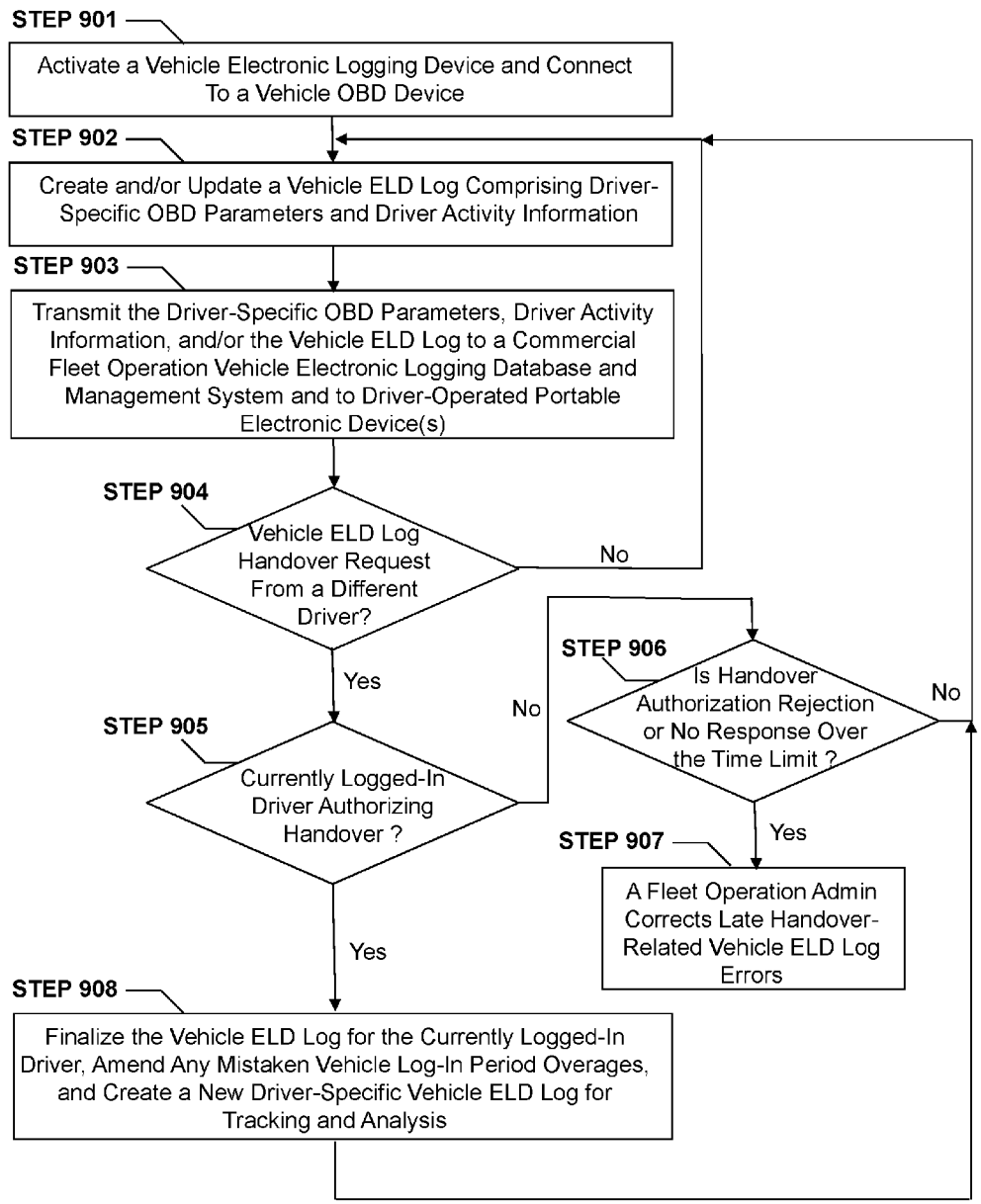
FIG. 9 shows an operational flowchart for a vehicle electronic logging authorization and handover system, in accordance with an embodiment of the invention.

FIG. 9 shows an operational flowchart (900) for a vehicle electronic logging authorization and handover system, in accordance with an embodiment of the invention. As a first step, the vehicle electronic logging authorization and handover system activates a vehicle electronic logging device (ELD) and connects to a vehicle OBD device, as shown in STEP 901. Typically, the vehicle ELD and the vehicle OBD device are both located inside a vehicle, and are discrete devices connected by a cable or by a wireless communication protocol. In some instances, the vehicle ELD and the vehicle OBD device may be a combined integrated device. The vehicle ELD and the vehicle OBD device are further configured to communicate with other components of the vehicle electronic logging authorization and handover system, such as driver-specific remote ELD log handover authorization or request mobile applications, portable electronic devices, and a commercial fleet operation vehicle electronic logging database and management system.

Once the vehicle ELD is connected to the vehicle OBD device and is activated, the vehicle electronic logging authorization and handover system can create and/or update a vehicle ELD log comprising driver-specific OBD parameters and driver activity information, as shown in STEP 902. Typically, the vehicle ELD log is created, updated, and maintained by an ELD management module (e.g. 607 of FIG. 6, 700 of FIG. 7) operating in the vehicle ELD (e.g. 105 of FIG. 1, 600 of FIG. 6) or in the commercial fleet operation vehicle electronic logging database and management system (e.g. 119 of FIG. 1). Then, driver-specific OBD parameters, driver activity information, and/or vehicle ELD log information can be transmitted to the commercial fleet operation vehicle electronic logging database and management system and to one or more driver-operated portable electronic devices, as shown in STEP 903. The driver-specific OBD parameters, driver activity information, and/or vehicle ELD log information are accumulated, stored, and categorized by specific drivers who time-share a particular vehicle.

Subsequently, the vehicle electronic logging authorization and handover system checks whether a vehicle ELD log handover request is received from a new driver who is not currently logged into the vehicle ELD as an on-duty driver, as shown in STEP 904. If the vehicle ELD log handover request is not received, then the process flow for the vehicle electronic logging authorization and handover system simply loops back to STEP 902. On the other hand, if the vehicle ELD log handover request is received by the vehicle electronic logging authorization and handover system, then the system checks and prompts whether the currently logged-in driver is willing to authorize the vehicle ELD log handover to the new driver, as shown in STEP 905.

If the currently logged-in driver authorizes the vehicle ELD log handover to the new driver via an electronic user interface provided by, for example, a mobile application executed on a portable device, then the vehicle electronic logging authorization and handover system finalizes the vehicle ELD log for the currently logged-in driver, amend any mistaken vehicle log-in period overages, and create a new driver-specific vehicle ELD log for tracking and analysis, as shown in STEP 908. Then, the process flow can loop back to STEP 902, as shown in FIG. 9.

On the other hand, if the currently logged-in driver does not authorize the vehicle ELD log handover to the new driver, as shown in STEP 905, then the vehicle electronic logging authorization and handover system also checks whether the currently logged-in driver's denial of authorization or a lack of response is over a defined limit, as shown in STEP 906. For example, the defined limit may be 30 minutes of no response from the currently logged-in driver, measured from the time of the new driver's vehicle ELD log handover request. In another example, the defined limit may be more than three consecutive denial command issuances by the currently logged-in driver. If the defined limit condition is not reached, then the process flow simply loops back to STEP 902, as shown in STEP 906. On the other hand, if the defined limit is reached, then a fleet operation administrator may intervene, override, and/or correct the late handover-related vehicle ELD log errors, as shown in STEP 907 of FIG. 9.

Various embodiments of the present invention provide several key advantages over conventional methods of driver log generation and maintenance. One advantage of an embodiment of the present invention is providing a novel electronic logging authorization and handover system that seamlessly accommodates commercial vehicle driver log handover requests and authorizations to improve and preserve robustness and non-overlapping uniqueness of electronically-generated commercial vehicle driver log data among a plurality of drivers who time-share a vehicle.

Furthermore, another advantage of an embodiment of the present invention is providing a novel method for operating the novel electronic logging authorization and handover system that seamlessly provides commercial vehicle driver log handover requests and authorizations to improve and preserve robustness and non-overlapping uniqueness of the electronically-generated commercial vehicle driver log data that are driver-specific among the plurality of drivers who time-share the vehicle.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A vehicle electronic logging authorization and handover system comprising:
   a vehicle on-board diagnostics (OBD) device connected to an engine control unit (ECU) or a vehicular control chip in a vehicle to record, diagnose, and generate an engine on or off status, vehicle speed data, acceleration and deceleration data, ambient air temperature data, and other vehicle diagnostics data as a raw OBD data stream;

a vehicle electronic logging device (ELD) connected to the vehicle OBD device, wherein the vehicle ELD is configured to generate a driver-specific ELD log that contains a currently logged-in driver's on-duty, off-duty, and resting activities associated with the vehicle;

an ELD and OBD data transceiver connected to the vehicle ELD, wherein the ELD and OBD data transceiver is configured to transmit ELD and OBD data to components of the vehicle electronic logging authorization and handover system that are remotely located outside the vehicle;

a remote ELD log handover authorization mobile application executed in a first portable electronic device for the currently logged-in driver, whose driving activities are currently interpreted, analyzed, and recorded by the vehicle ELD, wherein the remote ELD log handover authorization mobile application is configured to grant or deny an ELD log handover request from another driver;

a remote ELD log handover request mobile application executed in a second portable electronic device for a new driver who is scheduled to time-share and take over the vehicle after the currently logged-in driver, wherein the remote ELD log handover request mobile application is configured to create and transmit the ELD log handover request to the remote ELD log handover authorization mobile application executed in the first portable electronic device, and wherein a successful grant of the ELD log handover request by the first portable electronic device triggers the vehicle ELD to finalize the driver-specific ELD log associated with the currently logged-in driver's on-duty, off-duty, and resting activities associated with the vehicle, sign off the currently logged-in driver, and create a new driver-specific ELD log for the new driver;

a commercial fleet operation vehicle electronic logging database and management system that analyzes, stores, and categorizes a plurality of driver-specific ELD logs for a plurality of drivers who time-share the vehicle for each driver's mandatory resting requirement regulatory compliance and monitoring; and a data communication network configured to provide a wireless data information transfer among the vehicle ELD, the ELD and OBD data transceiver, the first portable electronic device, the second portable electronic device, and the commercial fleet operation vehicle electronic logging database and management system.

2. The vehicle electronic logging authorization and handover system of claim 1, further comprising a computer server with a CPU and a memory unit that execute the commercial fleet operation vehicle electronic logging database and management system.

3. The vehicle electronic logging authorization and handover system of claim 1, wherein the driver-specific ELD log containing the currently logged-in driver's on-duty, off-duty, and resting activities associated with the vehicle is generated by interpreting at least one of the engine on or off status, the vehicle speed data, the acceleration and deceleration data, and motion sensing of the currently logged-in driver in a driver cabin or a sleeper cabin in the vehicle.

4. The vehicle electronic logging authorization and handover system of claim 1, wherein the remote ELD log handover authorization mobile application executed on the first portable electronic device generates current driver log-in status time graph and alert, current driver log-in status textual information, and an ELD log handover authorization interface for the currently logged-in driver.

5. The vehicle electronic logging authorization and handover system of claim 1, wherein the remote ELD log handover request mobile application executed on the second portable electronic device generates current driver log-in status time graph and alert, current driver log-in status textual information, and an ELD log handover request interface for the new driver.

6. The vehicle electronic logging authorization and handover system of claim 1, wherein the vehicle ELD comprises a CPU, a memory unit, an ELD management module, a data storage unit, a power supply, and input and output interfaces.

7. The vehicle electronic logging authorization and handover system of claim 6, wherein the ELD management module comprises a driver-specific OBD information management module for recording and categorizing the vehicle's speed, acceleration, mileage, and engine activity per driver, a driver authentication and vehicle access duration tracking module, a driver-specific resting activity tracking module, a driver-specific ELD log-in, log-out, and handover authentication module, and an information display management module.

8. The vehicle electronic logging authorization and handover system of claim 1, wherein the first portable electronic device and the second portable electronic device are smart phones, tablet computers, notebook computers, personal computers, or specialized driving activity communication devices.

9. The vehicle electronic logging authorization and handover system of claim 1, wherein the vehicle is a truck, a van, a bus, a taxi, a limousine, or a passenger vehicle, which is time-shared among the plurality of drivers.

10. The vehicle electronic logging authorization and handover system of claim 1, wherein the data communication network is a cellular communication network, a satellite communication network, a land-mobile radio communication network, a wireless local area network, or a combination thereof.

* * * * *